United States Patent
Purpura

(10) Patent No.: US 8,478,838 B2
(45) Date of Patent: Jul. 2, 2013

(54) SYSTEM AND METHOD FOR USING A SAME PROGRAM ON A LOCAL SYSTEM AND A REMOTE SYSTEM

(75) Inventor: Robert J. Purpura, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/784,928

(22) Filed: May 21, 2010

(65) Prior Publication Data

US 2010/0299384 A1 Nov. 25, 2010

Related U.S. Application Data

(63) Continuation of application No. 11/733,364, filed on Apr. 10, 2007, now abandoned.

(51) Int. Cl.
*G06F 15/16* (2006.01)

(52) U.S. Cl.
USPC ............ 709/217; 709/201; 709/203; 709/223

(58) Field of Classification Search
USPC .. 709/201, 203, 205, 217, 223, 224; 719/310, 719/313; 718/100, 101
See application file for complete search history.

(56) References Cited

U.S. PATENT DOCUMENTS

| | | | | |
|---|---|---|---|---|
| 5,594,910 A * | 1/1997 | Filepp et al. | ..................... | 712/28 |
| 5,940,594 A * | 8/1999 | Ali et al. | ......................... | 709/203 |
| 6,006,277 A * | 12/1999 | Talati et al. | .................... | 719/313 |
| 6,182,123 B1 * | 1/2001 | Filepp et al. | .................. | 709/217 |
| 6,182,151 B1 * | 1/2001 | Cheng et al. | .................. | 719/310 |
| 6,389,431 B1 | 5/2002 | Frolund et al. | | |
| 6,473,807 B1 | 10/2002 | Hills et al. | | |
| 6,999,912 B2 | 2/2006 | Loisey et al. | | |
| 7,103,619 B1 * | 9/2006 | Rajpurkar et al. | ..... | 707/999.201 |
| 7,818,745 B2 * | 10/2010 | Snyder | ......................... | 718/100 |
| 7,840,635 B2 * | 11/2010 | Chan | ............................. | 709/203 |
| 2002/0042849 A1 * | 4/2002 | Ho et al. | ....................... | 709/329 |
| 2003/0167307 A1 * | 9/2003 | Filepp et al. | .................. | 709/205 |
| 2004/0143648 A1 | 7/2004 | Koning et al. | | |
| 2004/0268371 A1 * | 12/2004 | Carrell et al. | ................. | 719/330 |
| 2006/0168102 A1 | 7/2006 | Faller et al. | | |
| 2006/0230105 A1 | 10/2006 | Shappir et al. | | |

OTHER PUBLICATIONS

Ivan, A. et al., "Partitionable Services: A Framework for Seamlessly Adapting Distributed Applications to Heterogeneous Environments," 2002.
Anderson, R. et al., "Transparent Remote File Access in the Minimum Intrusion Grid," 2005.
"CICS Introduction," Sep. 21, 2004, pp. 1-6.
Non-Final Office Action, U.S. Appl. No. 11/733,364, Jun. 24, 2009.
Final Office Action, U.S. Appl. No. 11/733,364, Dec. 18, 2009.

* cited by examiner

*Primary Examiner* — Ramy Mohamed Osman
(74) *Attorney, Agent, or Firm* — Arthur J. Samodovitz

(57) ABSTRACT

A system and method implemented in a Customer Information Control System (CICS) Application configured to process information residing on remote systems and display such information on a local system, using a same program residing on both the remote system(s) and the local system. The method includes, for example, sending programming functions of a local system with a request for information to a remote system. The method further includes processing the programming functions of the local system with the request for information on the remote system to obtain updated information from the remote system. The updated information is sent to the local system for display.

10 Claims, 4 Drawing Sheets

```
Session B - CMCB - [24 x 80]
File  Edit  View  Communication  Actions  Window  Help SDIVMNU   Sysid BX25    -- SDI Transaction Monitoring Tool --    IBM Interna
                                                    System Time: 01/22/07 07:
--------------------------------Display Options------------------------------

Display Options....  I   U.  RETAIN Userid Transaction Activity and CDBM C
                         I.  SDI Client TCP/IP IP Address activity
Select an option,        D.  SDI Client Domain Name Activity
then press Enter key     A.  TCP/IP Session Abnormal Activity
                         E.  Userid list Exempted from Performance Monitor
                         B.  SDI Billing Id Activity T.  Currently running SDI Transactions
                         X.  SDI Security Exit Rejection Messages
                         L.  TCPIP Listener Stats and Status S.  Settings for Monitoring and Email Notificatio Available Sysids
BX25    BX1C    BX14    BX15    BX2C    BX2W    BX24    BX28    B2P5

-----------------------------------------------------------------------------
PF1= Help    PF3= Exit    PF5= Sysid List           PF12= Exit    Enter= S
MA    b
Connected to remote server/host b.dcm.boulder.ibm.com using ... EBF391
```

FIG. 4

SYSTEM AND METHOD FOR USING A SAME PROGRAM ON A LOCAL SYSTEM AND A REMOTE SYSTEM

CROSS REFERENCE TO RELATED APPLICATIONS

This is application is a Continuation application of U.S. patent application Ser. No. 11/733,364 filed Apr. 10, 2007 now abandoned and now U.S. Published Patent Application No. 2008/0256552 A1.

FIELD OF THE INVENTION

The present invention relates generally to computer systems, and more particularly to a system and method for processing a remote request.

BACKGROUND OF THE INVENTION

CICS is a transaction processing system designed for both online and batch activity. On large IBM zSeries and System z9 servers, for example, CICS easily supports thousands of transactions per second, making it a mainstay of enterprise computing. For this reason, CICS is used in bank teller applications, airline reservation systems, ATM systems, etc.

However, an application program designed to execute in the CICS Transaction Server environment can only access storage within its local CICS region. For example, with distributed processing, many remotely connected CICS regions can distribute databases and workload for load balancing to make the most efficient use of processing capacity. This causes customer information to be distributed, which requires complex coding techniques. This also can make application support and problem determination difficult and time consuming, which can have a negative affect on customer satisfaction and application availability.

CICS applications can be written in numerous programming languages, including COBOL, PL/I, C, C++, IBM Basic Assembly Language, REXX, and Java. But, programming techniques to provide access to storage on a remote CICS region can be complicated and require multiple programs. The CICS Transaction Server for z/OS and V2R3 CICS Application Programming Reference (SC34-6232) describes the available commands to access resources controlled by CICS, and the CICS Transaction Server for z/OS CICS Intercommunication Guide (SC34-6243) describes methods of CICS-to-CICS communication.

By way of example, the programming options available to the CICS applications include:
1. Intersystem Communication (ISC): ISC uses Advanced Program to Program Communication (APPC) which requires a client and server program relationship on both ends of the connection. APPC is a detailed protocol with distinct functions for each end of the conversation and requires careful coding of data syncpointing and error condition processing.
2. CICS Function Shipping: CICS Function Shipping provides access to resources and Virtual Storage Access Method (VSAM) files on a remote CICS region as if they were locally defined. The CICS Function Shipping does not provide a method to access storage (memory) or DB2 databases within the remote CICS region.
3. Asynchronous Processing: Asynchronous Processing allows a local CICS program to initiate a transaction on a remote CICS region and pass data to it, but no reply is possible.
4. Transaction Routing: Transaction Routing allows a local transaction to be shipped to a remote CICS region for processing, but there is no return to the originating CICS region.
5. TCP/IP sockets: TCP/IP sockets can be used in a client/server program relationship, with a complex send/receive protocol for each end of the communication channel and detailed error condition handling.
6. MQSeries: MQSeries can be used to send a request to a remote system via a message queue and receive a response message. MQSeries is designed to be asynchronous, so complex programming methods must be utilized to send a synchronous request and wait for a response.
7. Distributed Program Link (DPL): DPL allows a local CICS program to initiate a program on a remote CICS region. Data can be passed to the remote program and response data can be returned. The remote program has full access to all storage and databases on the remote CICS region and can pass information back to the originating program.

All of the above options require a detailed understanding of the selected programming interface, and in most cases require a separate type of programming on each end of the communication connection.

The DPL option provides the simplest method for a program to communicate with another program on a remote system. In DPL, the remote program has access to every resource, database, and storage area on that CICS region, as well as connecting to another CICS region through the same interface. However, in order to pass information between the local and remote programs, a common data area (also referred to as "commarea") is used. This is typically a data structure with defined fields which different programs at both ends utilize.

In the DPL type implementation, the required components include a source program, a target program, and the data defining area (copybook or macro) used to pass information between the source program and the target program. The target program, for example, is unique because it responds to the source program, in order to obtain data from the remote system. However, in implementation, it is not possible to directly access the data on the remote system; it is only possible to access the files on the remote system. That is, it is not possible to access the storage area on the remote system, using the local source program. Access to the storage area on the remote system is only possible using the target program on the remote system. Additionally, the data defining area has to be created such that it includes all fields associated with the remote system and it must be synchronized between the source program and the target program. This being the case, when a field in the data defining area is changed, the target program must have a corresponding change and, if not, the data will be corrupted. Accordingly, in use, the implementation of the source program, target program, and data-defining area requires additional programming and careful attention to synchronization, amongst other things.

Accordingly, there exists a need in the art to overcome the deficiencies and limitations described hereinabove.

SUMMARY OF THE INVENTION

In a first aspect of the invention, a method comprises sending programming functions of a local system with a request for information to a remote system. The method further includes processing the programming functions of the local system with the request for information on the remote system to obtain updated information from the remote system. The updated information is sent to the local system for display.

In another aspect of the invention, a system for obtaining information from a remote system comprises a computer infrastructure having one type of program for a local system and the remote system. The program is operable to send programming functions of the local system with a request for information to the remote system, process the programming functions of the local system and the request for information on the remote system and send the updated information to the local system for display, via a defined common area storage.

In another aspect of the invention, a computer program product comprising a computer usable medium having readable program code embodied in the medium is provided. The computer program product includes at least one component to perform the steps of the invention.

BRIEF DESCRIPTION OF THE DRAWINGS

FIG. 4 is an illustrative graphical representation (screen shot) implementing aspects of the invention.

DETAILED DESCRIPTION OF EMBODIMENTS OF THE INVENTION

The invention relates to a system and method implemented in a Customer Information Control System (CICS) Application configured to process information residing on remote systems and display such information on a local system, using a same program residing on and/or associated with both the remote system(s) and the local system. The invention can be implemented over any distributed network, for example, and any existing program can be modified to take advantage of the benefits and functionality of the system and method of the invention. In one preferred embodiment, the system and method is implemented on IBM mainframe systems under z/OS, z/VSE, i5/OS or OS/2 operating systems, amongst other implementations.

The system and method of the invention requires only one program to be developed which executes on both ends of the communication channel without any communications interface programming; compared to a client/server model using separate programs and complicated communication protocols. Additionally, in the system and method of the invention all of the defined dynamic storage is available to the program on both ends of the communications link, making the process of transferring programming functions from one system to another seem nearly transparent. In such implementations, the system and method of the invention takes virtually the entire working storage of the program (on the local system) and passes it to and returns it from the program on the remote system. Also, the program implemented in the system and method of the invention is configured in such a manner as to allow access to the storage area on the remote system using the program on the local system.

In implementation, the system and method of the invention utilizes a Distributed Program Link in such a manner as to eliminate the need for a target program and data defining area. In this manner, the system and method of the invention greatly simplifies the required programming into a single program, which handles both client and server functions and eliminates communications protocol requirements. That is, for example, in implementation, the system and method of the invention defines a method for a program executing on a local (originating) CICS region to access information on a remote (target) CICS region.

System Environment

Figure 1:
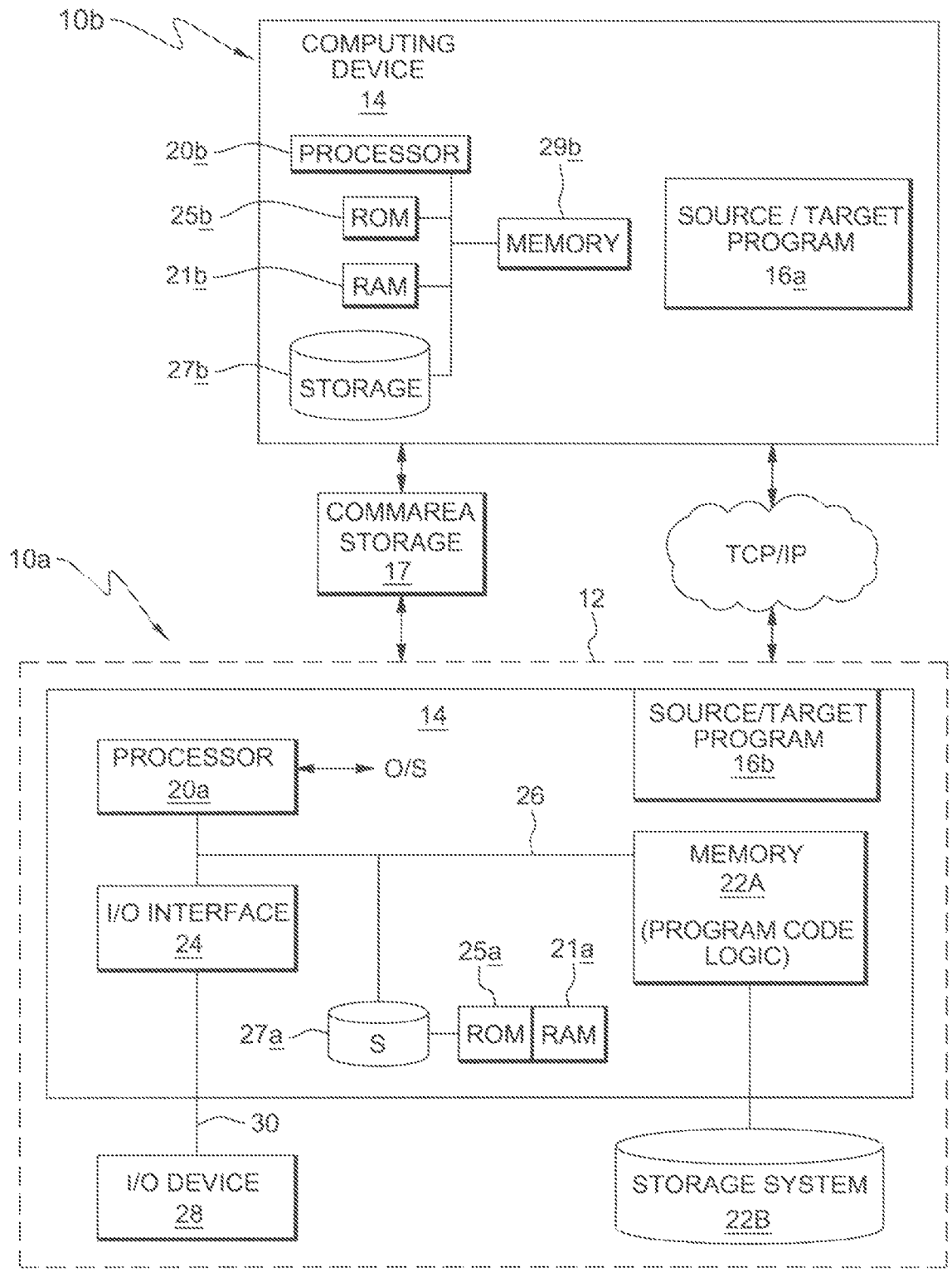
FIG. 1 shows an illustrative environment for implementing the steps in accordance with the invention.

FIG. 1 shows an illustrative environment for managing the processes in accordance with the invention. The illustrative environment may be a server or a user workstation, for example, and may represent both a local system 10a and a remote system 10b implementing a CICS. In one preferred embodiment, the illustrative environment is implemented on IBM mainframe systems under z/OS, z/VSE, i5/OS or OS/2 operating systems (O/S), amongst other implementations.

The environment includes a computer infrastructure 12 having a computing device 14 (e.g., including a source/target program). More specifically, the computing device 14 includes a program 16a, 16b, which is identical on both the local system 10a and the remote system 10b. In this manner, it is possible to eliminate the use of different programs on the local system 10a and the remote system 10b. The remote system 10b may additionally include the remaining or similar components that reside on and/or are associated with the local system 10a, e.g., ROM, storage, external devices, etc, as described herein. The local system 10a can be linked to the remote system 10b using, for example, any type of networks (e.g., the Internet, a wide area network, a local area network, a virtual private network, etc.); and/or any known transmission techniques/protocols (e.g., TCP/IP).

In embodiments, the program 16a, 16b performs several functions including, for example, (i) organizing all of the program's working or dynamic storage into a defined data structure;

(ii) recognizing, validating and processing the input for a remote system request; and (iii) performing a simple Distributed Program Link (DPL) call to the same program residing on the remote system (as is on the local system), and passing the working storage data structure in a CICS Link Commarea (common area between the remote and local systems).

Additionally, in further embodiments, the program 16a, 16b includes executable code, which may be stored temporarily or permanently in a memory 22A. As should be understood by those of skill in the art, the executable code can be configured to implement the above functions.

In implementation, the program 16b on the remote system 10b will use information in a common area storage 17 (hereinafter referred to as a common area storage) as its working storage to collect and process the requested information and return it to the calling program on the local system 10a. Also, if 3270 type screens are used, the screen data can be formatted in the working storage on the remote system 10b. (The 3270 type screen is represented as I/O device 28.) As discussed in further detail below, on return from the remote program link, the data in the common area storage 17 would reflect the updated information from the remote system 10b as if it had been processed locally in the working storage 22B on the local system 10a. In this way, the screens would be ready for display to the user on the local system. The working storage area 22B on the remote system 10b may be defined and used in exactly the same manner as the same program 16a on the local system 10a.

Still referring to FIG. 1, the memory 22A can include local memory employed during actual execution of program code, bulk storage, and cache memories which provide temporary storage of at least some program to reduce the number of times code must be retrieved from bulk storage during execution. The computer infrastructure 12 further includes a processor 20a, an input/output (I/O) interface 24, a bus 26, Storage "S" 27a, ROM 25a, RAM 21a and an external I/O device/resource 28. Likewise, computing device 14 includes a processor 20b, storage 27b, ROM 25b, RAM 21b and memory 29b. Program 16a is stored on a computer readable storage media 27a for execution by processor 20a via computer readable RAM 21a or computer readable memory 22A. Program 16a is stored on a computer readable storage media 27b for execution by processor 20b via computer readable RAM 21b or computer readable memory 29b.

The external I/O device/resource 28 may be a keyboard, display, pointing device, or any device that enables the computer infrastructure 12 to communicate with one or more other computing devices using any type of communications link 30. The communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

The processor 20 executes the computer program code and logic of the system and method of the invention, which is stored in the memory 22A. While executing the computer program code, etc., the processor 20 can read and/or write data to/from the memory 22A, storage system 22B, and/or I/O interface 24. The bus 26 provides a communications link between each of the components in the computing device 14.

As an alternative, the invention is configured for any computer application running on any operating platform that comprises a program executing on a local system that uses some representation of working storage containing variable data. In this embodiment, the computer application is configured to send such data to a remote system, whereby the same program or a different program could use the data for it's own working storage, and return the updated storage to the originating program. The originating program working storage would be altered to values updated by the remote program. This would include communication such as, for example, (ISC), (TCPIP), and (MQSeries); although (DPL) would be the easiest to implement.

Architecture of Embodiments of the Invention

Figure 2:
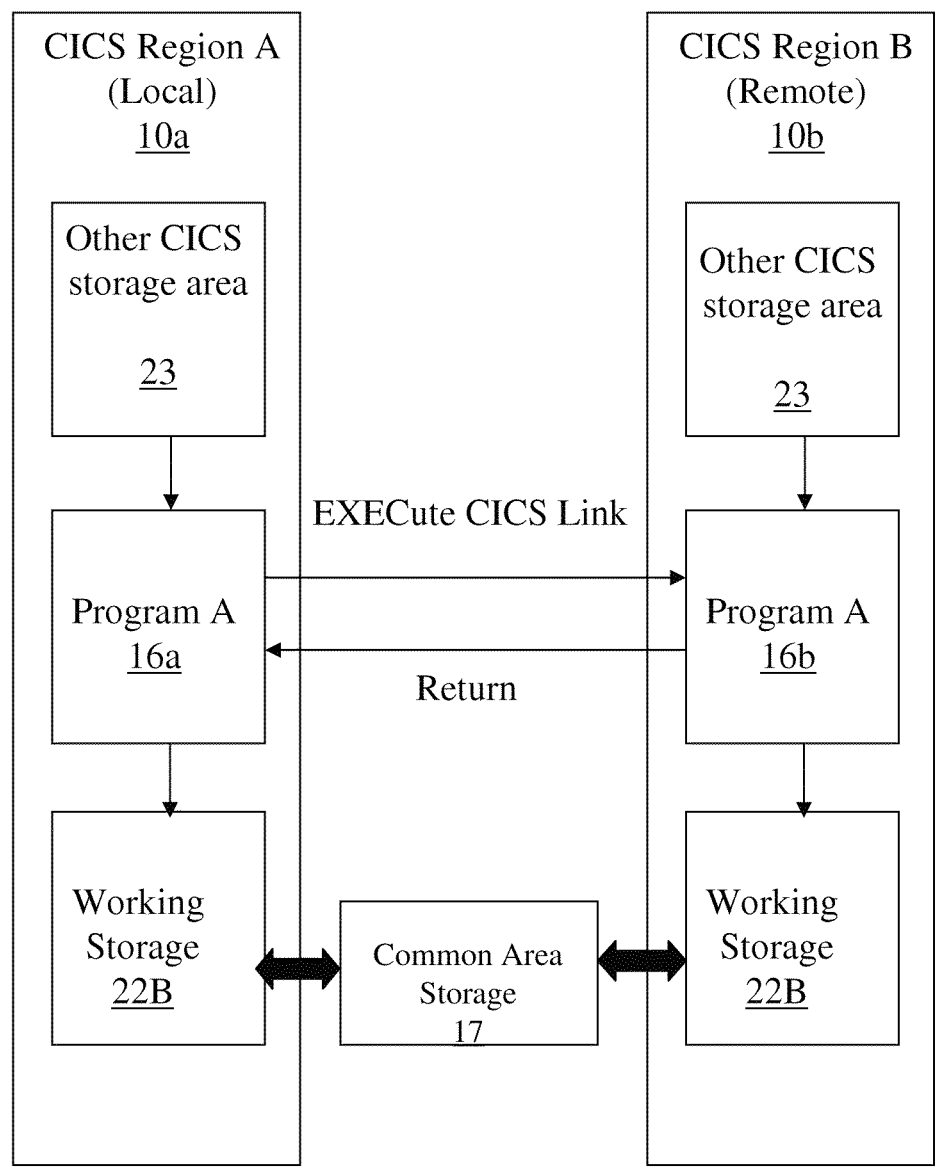
FIG. 2 shows an architecture in accordance with an aspect of the invention.

FIG. 2 shows an architecture in accordance with an aspect of the invention. More specifically, the architecture includes a local system 10a and a remote system 10b. Both the local system 10a and the remote system 10b include, for example, the same program "A", 16a, 16b, as well as a storage area 22B and CICS storage area 23. The architecture also includes common area storage 17, which is a common storage for both the local system 10a and the remote system 10b. As described herein, the program 16b on the remote system 10b will use information in the common area storage 17 as its working storage to collect and process the requested information and return it to the calling program on the local system 10a. On return from the remote program link, the data in the common area storage 17 reflects the updated information from the remote system 10b as if it had been processed locally in the working storage 22B on the local system 10a.

An EXECute CICS LINK is provided between the local system 10a and the remote system 10b. The EXECute CICS LINK is a standard function of the CICS command level interface. In embodiments, six fields are used with the EXECute CICS LINK. In one non-limiting illustrative example, the six fields include:

(i) PROGRAM name: The PROGRAM name identifies the name of the program to execute on the remote system.
(ii) Remote System SYSID: The Remote System SYSID is used by CICS to direct the request to a remotely attached CICS region, e.g., region B. This SYSID should be predefined and connected.
(iii) COMMAREA: The COMMAREA defines the data that is passed to the program on the remote system 10b as a serialized structure, which can be identified by a high level name.
(iv) LENGTH: The LENGTH is used to define the data length of the common area 17.
(v) SYNCONRETURN parameter: The SYNCONRETURN parameter notifies the remote system 10b to commit any changes to protected resources on completion on the program execution.
(vi) NOHANDLE parameter: The NOHANDLE parameter instructs CICS to give control back to the application program (on the local system) regardless of error conditions from the link command. This allows the program to be aware of and handle a failure of the link command.

In embodiments, the program 16a (or 16b) may display the current SYSID value, optionally display a list of possible remote systems, and recognize a request to change the SYSID value to a remote system (or back to the local system). Alternatively the program 16a (or 16b) can work from a hardcoded list of remote systems. Thus, in use, the only requirement for a user is to select the desired remote target system, which could be presented from a list or other similar method suitable for the application.

The program 16a (or 16b) also uses a procedure to perform the remote distributed program link with the common area and checks for error conditions such as an invalid or unavailable remote system. The program 16a (or 16b) is also configured to log the invalid or unavailable remote system condition or report back to the user such condition.

In embodiments, it is preferable that no variable length fields be defined because the data structure requires a fixed length for the CICS link common area 17. Also, any fields which are not relevant to the distributed program link, such as local loop counters, pointers to local data areas, local time, or user 3270 terminal related information may be excluded from the data structure.

Additionally, following the CICS link all fields are updated as if they were updated locally. In this manner, the CICS link is virtually transparent to the program residing on the local system 10a (and hence the user). Also, all information is shared between the programs "A" 16a and 16b on both ends of the channel, so current screen status, scroll information, function keys pressed by the user, and any other fields required to be session persistent are maintained in the working storage 22B. In illustrative and non-limiting examples:

If repetitive functions are performed such as scrolling, the current and next positions are always known and updated; and/or If help screens or nested panels are displayed, the information required to back out of the screens is maintained for both the local program execution (e.g., on local system 10a) and remote program execution (e.g., on remote system 10b), as if all program functions were performed locally.

In implementation, writing a new program or converting an existing program includes defining all working or dynamic storage variables used by the program 16a (or 16b) into a data structure with a high level name of the structure. For an existing program, all of the variables should be collected and defined in this structure.

Flow Diagram Implementing Steps of the Invention

Figure 3:
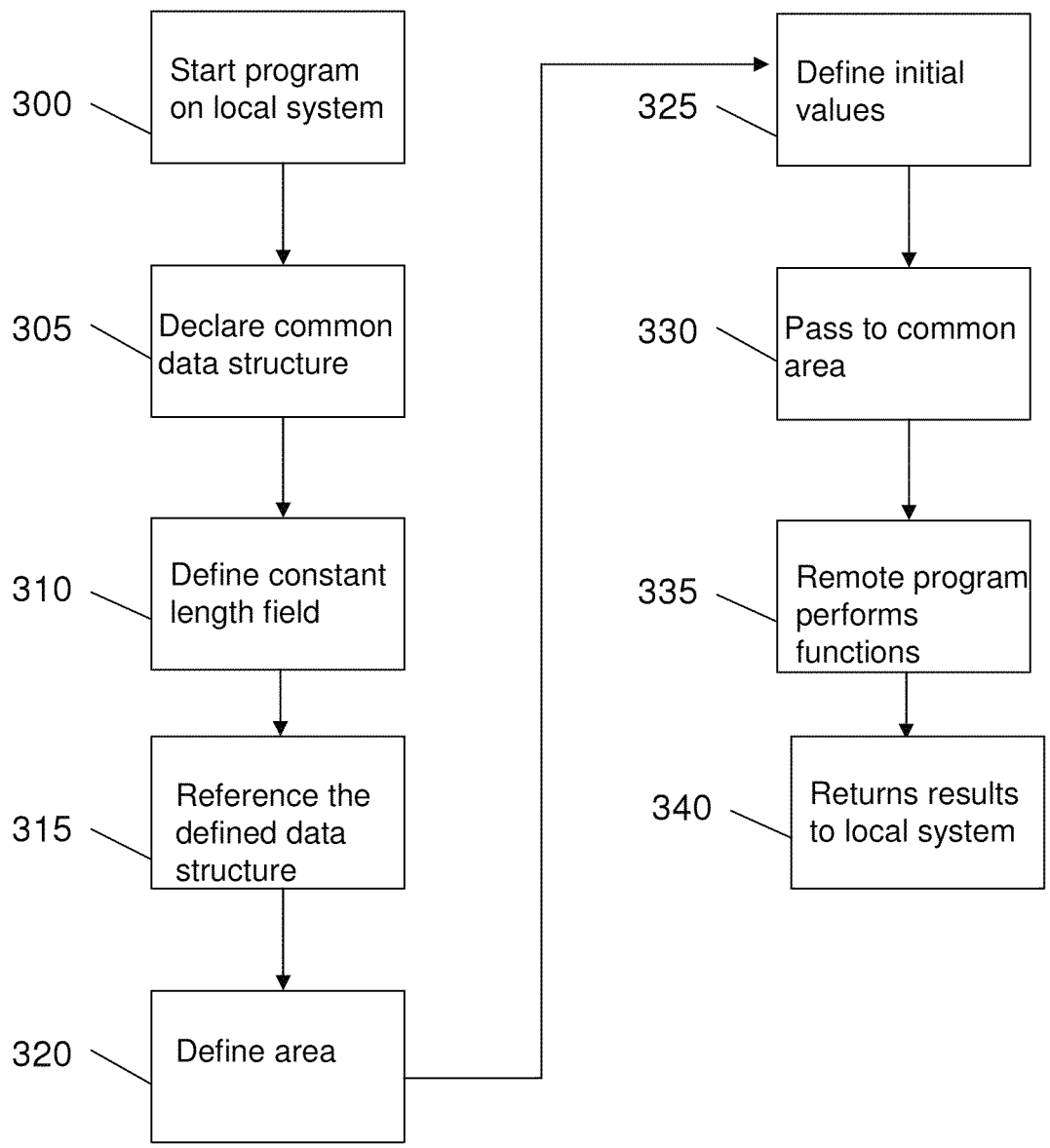
FIG. 3 is a flow chart of steps for implementing aspects of the invention.

FIG. 3 represents a flow diagram implementing steps of the invention. The steps of FIG. 3 may be implemented in the environment of FIG. 1 or architecture of FIG. 2. The steps of the invention may equally represent a high-level block diagram of the invention.

The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Referring to FIG. 3, at step 300, the program starts on the local system. At step 305, the process declares a common data structure as an area referenced by a pointer, containing various fields required for the execution of the program. At step 310, in embodiments, the process defines a constant length field to reference the length of the common area. At step 315, a pointer can be used to reference the defined data structure, which can either be local storage on the local system or the common area provided in the CICS link on the remote system. At step 320, the process defines an area in local working or dynamic storage for the program when executing on the local system. In embodiments, at step 325, all of the initial values of the program executing on the local system are stored in this area, as well as the ongoing values as the program progresses through its functions.

At step 330, if there is a need to access a remote system, then the process provides an area having the initial values and any ongoing values to CICS in the remote program link, which is passed to the remote system as a common area. At step 335, using the information provided to CICS, in the remote program link, the program on the remote system performs its requested tasks and, at step 340, returns its information to the local system via, for example, the common area. That is, the program on the remote system uses the information in the common area storage as its working storage to collect and process the requested information and return it to the calling program on the local system.

Examples of Operation

The program logic can be shown in the following non-limiting examples, written in PL/1 language but easily adapted to other languages. A common data structure is declared as an area, referenced by a pointer, containing various fields required for the execution of the program. These fields may be defined as follows:

```
declare
Pgm_Commarea based(Workarea_Ptr),
Current_Screen char(8),
Help_Flag char(1),
Routed_Flag char1),
Message_Text char(80),
Screen_cmd char(3),
Current_Line fixed binary(31),
Last_Line fixed binary(31),
Return_Code fixed binary(31),
Total_Records fixed binary(31);
```

A constant length field can be defined to reference the length of the Commarea (common area). By way of non-limiting example,

```
declare Commarea_Length fixed binary(15)
initial(cstg(Pgm_Commarea)); /* set commarea length */
```

A pointer can be used to reference the defined data structure, which can either be local storage on the local (originating) system 10a or the common area provided in the CICS link (EXECute CICS LINK) on the remote system 10b. By way of a non-limiting illustrative example:

```
declare Workarea_Ptr pointer; /* define a pointer to reference the
working storage */
```

An area may be defined in local working or dynamic storage for the program 16a when executing on the local system 10a. In embodiments, all of the initial values are stored in this area, as well as the ongoing values as the program 16a progresses through its functions. If there is a need to access a remote system 10b, then this area is provided to CICS in the remote program link to be passed to the remote system 10b as a common area, where it is updated and returned. By way of a non-limiting illustrative example:

```
declare Pgm_Workarea char(cstg(Pgm_Commarea)); /* reserve
a space for the structure in working storage */
```

When the program 16a first executes, a simple check may be made to determine how the program 16a was started. For example, if the program 16a was started with a commarea (e.g., by a check of the commarea length provided by CICS) via the Distributed Program Link, then the pointer to the working area is assigned from the CICS-provided commarea address. If the commarea length is zero, the program 16a is determined to be started locally by, for example, a 3270 terminal user or another background program. In the latter example, the pointer is assigned the address of the local dynamic storage area. By way of a non-limiting illustrative example:

```
if EIBCALEN = Commarea_Length then /* a commarea exists,
program was linked to */
Workarea_Ptr = DFHEICAP; /* reference working storage from
CICS commarea address */
else /* normal start on local system by user */
Workarea_Ptr = addr(Pgm_Workarea); /* reference working
storage in dynamic storage area */
```

If the program 16a was started on the local system 10a, then the fields of the data structure (Pgm_Commarea data structure) are completed using information on the local system 10a and presented to the user. If a commarea exists, the program 16b running on the remote system 10b can determine what information is being requested by the originating local program and complete the data structure to be returned to the originator.

In embodiments, the program determines when a remote system 10b needs to be accessed. When the transaction is 3270 user driven, for example, the program 16b can request access from a field on the user's screen. In a background transaction environment, in another embodiment, access can be requested from a list of remote systems. By way of a non-limiting illustrative example, the code executing the distributed program link can include:

```
EXEC CICS LINK PROGRAM('PROGRAMA')
SYSID(ssss)
COMMAREA(PGM_WORKAREA)
LENGTH(COMMAREA_LENGTH)
SYNCONRETURN
NOHANDLE;
if EIBRESP > 0 then /* an error occurred on the link command */
do;
/* perform error condition handling..... */
end;
```

The SYSID parameter contains the CICS target destination and the commarea contains the program data. If the SYSID contains the local system definition, a local link is performed as if the SYSID was not defined. Values in the commarea would indicate the operations that need to be performed by the program on the remote system 10b. On return from remote processing, the commarea will be updated with any changes from the program executing on the remote system. A 3270 screen would display the values on the remote system. The SyncOnReturn parameter notifies the remote system to take a syncpoint on completion of the executing program, to commit any protected resource changes. The NOHANDLE parameter notifies CICS to return control to the originating program even if an error occurs in the LINK command, with the appropriate error code in the EIBRESP field.

In further implementations, the design of the system and method of the invention also includes the capability of the program executing on the remote system to forward the request to another CICS region for processing. This is a form of intermediary routing. The commarea returned to the originating program would actually be updated by the secondary remote system.

Exemplary Graphical Display

FIG. 4 shows an exemplary screen image of an application using the system and method of the invention. This screen can be representative of information retrieved from a remote system, now displaying on a local, originating system.

By way of example, the field in the upper left corner, SYSID, is used to select a remote system to display SDI (Simulation Database Interface) transaction information. The SYSID term is synonymous with the name of a computer system. As assistance to the user, a list of possible values is displayed in the lower portion of the screen. In this example, the user is connected to the BX25 system. If any of the other available SYSID values is typed into the SYSID field, any of the display options selected will cause the remote program call to retrieve the selected information, and the resulting displayed screen will display information acquired from the remote system. This will occur as if the user had logged off the connected system and logged into the remote system. Further, this operation can be repeated with all of the other systems in the list to quickly collect a view of the entire network in a very short period of time.

While the invention has been described in terms of embodiments, those skilled in the art will recognize that the invention can be practiced with modifications and in the spirit and scope of the appended claims.

What is claimed is:

1. A method for processing a request by a user of a program executed in a first computer, the method comprising the steps of:
    the program initiating display of a first computer screen and another computer screen superimposed on the first computer screen and storing information in a first working storage area identifying a state of the first computer screen and information needed to back out of the other computer screen;
    the program receiving, by user entry to the first computer screen, a request of a type processed by the program, and in response, the program updating the first working storage area to indicate the request, and the first computer sending to a second computer a copy of contents of the first working storage area, the contents including the request, the state of the first computer screen and the information needed to back out of the other computer screen;
    the copy of the program in the second computer processing the request using contents of a second working storage area copied from the contents of the first working storage area sent by the first computer and updating the contents of the second working storage area with a result of the processing of the request; and
    the second computer sending to the first computer the contents of the updated second working storage; and
    the first computer updating the contents of the first working storage area with the contents of the updated second working storage sent by the second computer, and the program in the first computer initiating display of an updated computer screen based on the updated contents of the first working storage area.

2. The method of claim 1 wherein the request is to obtain updated information relating to a transaction.

3. The method of claim 1 further comprising the subsequent step of the program in the first computer completing processing of the request using the contents of the updated second working storage sent by the second computer.

4. The method of claim 1 wherein before the step of the program stored in the first computer updating the first working storage area to indicate the identity of the second computer, further comprising the step of the program in the first computer receiving from the user, by user entry to the first computer screen, an identification of the second computer storing a copy of the program to process the request.

5. The method of claim 1 wherein the program in the first computer suspends processing the request at a point before the step of sending to the second computer a copy of the contents of the first working storage area, and the copy of the program in the second computer begins its processing of the request at the point where the program stored in the first computer suspended processing the request.

6. The method of claim 5 further comprising the subsequent step of the program in the first computer completing processing of the request without data from the second computer except for the contents of the updated second working storage previously sent by the second computer.

7. The method of claim 1 further comprising the subsequent step of the program in the first computer completing processing of the request without data from the second computer except for the contents of the updated second working storage previously sent by the second computer.

8. The method of claim 1 wherein the copy of the program in the second computer backs out the other computer screen using the information needed to back out of the other computer screen contained in the contents of the first working storage area sent by the first program.

9. A computer program product comprising one or more computer-readable tangible storage devices and computer-readable program instructions which are stored on the one or more storage devices and when executed by one or more processors of the first and second computers of claim 1 perform the method of claim 1.

10. The first and second computers of claim 1, the first and second computers comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

* * * * *